United States Patent Office 3,357,157
Patented Dec. 12, 1967

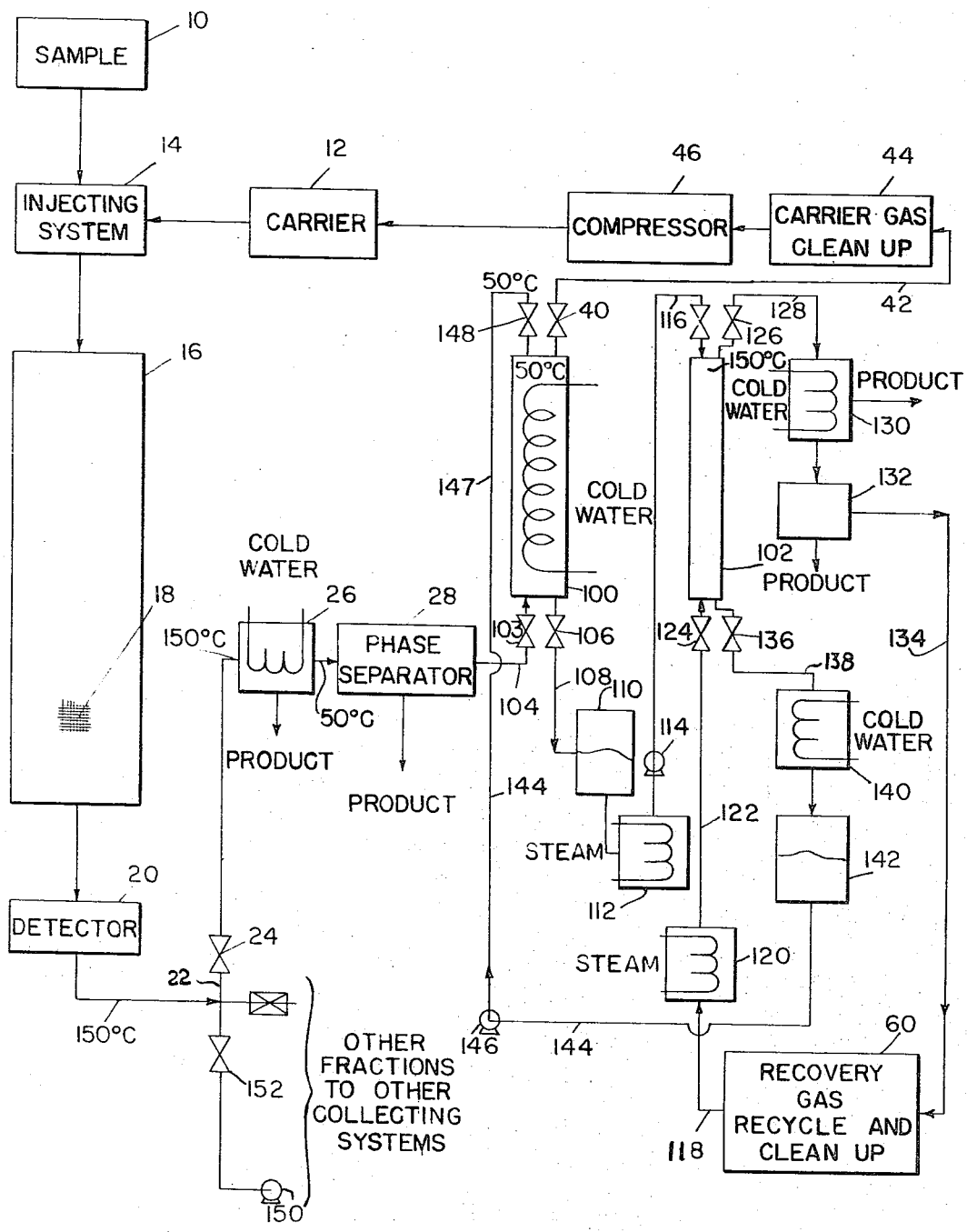

3,357,157
METHOD OF FRACTION COLLECTING OF SAMPLES FROM A GAS CHROMATOGRAPHIC SYSTEM
John F. O'Donnell, Wellesley Hills, Mass., assignor to Abcor, Inc., Cambridge, Mass., a corporation of Massachusetts
Filed Apr. 4, 1966, Ser. No. 539,837
10 Claims. (Cl. 55—23)

My invention concerns gas chromatography collection systems. In particular my discovery relates to methods of and means for the efficient collection of one or more gas effluent fractions from the outlets of one or more gas chromatographic columns.

Gas chromatography involves the separation of various compounds, materials, mixtures and the like from a sample stream. Preparative or production scale gas chromatography includes the recovery of one or more specific chromatographic fractions from a gas effluent stream of a chromatographic column. The gas effluent stream typically comprises a carrier gas and a series of separated fractions of the sample in the gas phase to be recovered or removed, which fractions are eluted or withdrawn from the column outlet in a particular order and over a particular time interval.

The most common technique of fraction collecting involves the direct cooling of the fraction-containing effluent stream to a temperature sufficiently low to condense the desired fraction to the liquid or solid state. The condensed fraction is then recovered from the cooled surfaces of the condensing vessel. These means are usually quite direct and simple. However, the efficiency of collection, i.e. the percent of the gas fraction recovered, is often quite low. Where difficulty separated, expensive, exotic or unique gas fractions are to be collected, these direct means are often economically unattractive or inadequate. Collection efficiencies of 80% or 95% or higher are often desirable or required for the economic use of preparative or production scale gas chromatography systems. Typically preparative systems employ chromatographic columns having an internal diameter of from 1 to about 6 inches, while production scale systems refer to larger diameter columns such as 1 to 4 feet or greater. In preparative and production scale chromatographic systems, the fixed capital and operating costs of a high efficiency fraction collecting scheme employing a refrigeration system is often a considerable part of the total fixed and operating cost of the total chromatographic system. It is, therefore, also most desirable to provide fraction collecting systems of reduced cost and high efficiency.

The fraction collecting of a gas effluent fraction from a gas chromatographic system presents several unique difficulties. In many cases the effluent gas stream withdrawn from the outlet of a gas chromatographic column has a very low concentration of the gas fraction to be recovered. If the fraction to be recovered exceeds 50% or more in the gas effluent stream, direct cooling may offer some advantages, although often recoverable traces of the gas fraction will be present in the residue stream. Lesser amounts such as less than 25% may require special techniques for collection efficiencies of 90% or more. For example, the effluent gas stream may typically contain only 0.1 to 10.0 mol percent of the desired gas fraction in the inert carrier gas stream. Where very expensive sample materials such as steroids, essential oils, flavors, special research mixtures, and the like are processed, the amount of the sample fraction in the effluent gas stream may be even lower, such as from about 0.001 to 0.1 mol percent. The dilution of the sample vapor with inert carrier gas, therefore, presents problems in fraction collecting. Rapid and direct cooling of the effluent stream to condense the desired fraction provides condensation, but quite often in the form of a fog or aerosol of the fraction in the carrier stream which makes the easy and efficient recovery of the fraction in the fog increasingly more difficult and expensive. Additionally, the cooling of the carrier gas which occupies the bulk of the effluent gas stream is inefficient and often requires a large refrigeration system. Therefore, fraction collecting systems for gas chromatographic units which are efficient and which avoid at least some of the difficulties of cooling alone are most desirable.

It is, therefore, one object of my invention to provide systems for the efficient collection of gas fractions from a gas effluent chromatographic stream.

It is another object of my invention to provide a method of absorbing a gas fraction from a gas effluent stream from one or more chromatographic columns in a liquid stream to enable the gas fraction to be more easily recovered at high efficiency.

A futher object of my discovery is to provide a method of fraction collecting which avoids some of the difficulties of the prior art and which permits collection even though a fog or aerosol of the gas fraction has been or may be formed.

Other objects and advantages of my invention will be apparent to those persons skilled in the art from the following more detailed description of my invention taken together with the accompanying drawing wherein there is shown a schematic process flow diagram for the collection of gas fractions from a gas chromatographic column employing an absorption zone and a stripping zone.

Briefly, my invention comprises a system wherein the gas fraction to be recovered from a gas effluent stream withdrawn from one or more gas chromatographic systems, is absorbed in a liquid in an absorption zone and the fraction subsequently recovered or concentrated from the fraction-enriched liquid. In one embodiment my process comprises withdrawing from one or more gas chromatographic columns one or a series of gas effluent streams, each stream containing a quantity of a similar gas fraction which is to be recovered. The gas effluent streams are cooled and then periodically or continuously introduced into an absorption column. A liquid stream in which the gas fraction is soluble or capable of being absorbed is also introduced into the absorption column preferably in a cross or counter-current flow direction from the flow direction of the gas effluent stream. A liquid stream enriched in the absorbed gas fraction is then withdrawn from the absorption column, and the gas fraction recovered from the liquid stream, and the liquid stream re-cycled for use in the absorption column. Cooling of the gas effluent stream below the temperature of the gas chromatographic systems from which withdrawn is recommended to recover any massive condensate obtainable in this manner and to enhance the absorption characteristics and capacity of the gas fraction in the absorption zone.

The fraction may be recovered from the fraction enriched liquid stream withdrawn from the absorption zone in any manner. However, in one preferred operation the fraction enriched liquid stream is introduced into a stripping zone. A heated stripping or recovery gas is also introduced into the zone, preferably in a cross or counter-current flow direction to the flow direction of the fraction enriched liquid stream. The stripping or recovery gas is heated in order to enhance the efficiency of the stripping and concentration operation. The fraction absorbed in the liquid stream is then stripped from the liquid stream and concentrated in a recovery gas or stripping gas effluent stream withdrawn from the stripping column. The liquid stream from which the fraction is removed is then re-cycled for use in the absorption zone. The recovery or stripping gas effluent stream containing the gas fraction is in a much more concentrated form then in the gas effluent stream withdrawn from the gas chromatographic system, e.g. 10 to 1000 times more concentrated. The gas may be recovered by cooling and condensing the gas fraction with the recycling of any recovery gas back to the stripping zone. The recovery gas should be selected so that the gas fraction is easily recoverable therefrom with a minimal difficulty; however, the recovery gas may comprise all or a portion of the carrier gas from which the gas fraction was removed in the absorption zone. In a typical operation the carrier gas from which the gas fraction is removed in the absorption zone is recycled for use in the gas chromatographic system after clean-up and compression. The recovery or stripping gas is preferably steam, nitrogen, carbon dioxide, carbon monoxide, methane or the like from which the gas fraction may be removed by condensation, permeation, distillation, evaporation, absorption, adsorption or the like.

A specific embodiment of my process and system is shown in the drawing. For the purposes of illustration only my processes will be described in connection with the recovery of a beta pinene fraction from a terpene mixture containing alpha pinene, beta pinene and at least one other terpene fraction. A terpene mixture containing beta pinene is introduced from a sample source 10 into an injection system 14 and a predetermined volume of the sample mixture in gas form is injected into the upstream end of a relatively large diameter, for example a four inch chromatographic column 16 containing a packed bed of separatory material 18. On passage through the column 16 the terpene mixture is separated into its respective gas chromatographic fractions which in this particular case includes alpha pinene, beta pinene and another fraction. The sample mixture is driven to the downstream end of the column 16 in a generally axial direction by the use of an inert carrier gas such as helium introduced into the upstream end of the column 16 from a source 12, either into the injection system as shown or directly into the top of the column either mixed with the gas sample or injected between sample injections. Typical carrier gases for use in chromatographic systems include any inert carrier gases such as helium, nitrogen, argon, air, steam, hydrogen, methane and the like or mixtures thereof. The separatory material 18 is selected based on the differential rate of adsorption or absorption required to separate the sample mixture into its various chromatographic fractions. In our illustrated example, helium is the carrier gas with the temperature of the column maintained at approximately 150° C. with the separatory material being diatomaceous earth, Johns-Manville Chromasorb W of 60/80 mesh having a liquid phase thereon of poly (diethylene glycol succinate), 20 gms. per 100 gms. of Chromasorb W. A gas effluent stream containing each fraction is conducted from the exit end of the chromatographic column 16 to and through a detector 20 and then into a manifold conduit 22. The detector employed may be a pair of thermoconductivity cells which balance the heat conduction of the gas effluent stream from the exit end of the chromatographic column 16 against the pure carrier gas to detect the particular gas fraction being withdrawn from the column. Depending upon the system employed, other detectors such as flame ionization detectors, electron capture detectors, argon ionization detectors, cross-section detectors, electron mobility detectors, ultrasonic detectors, radio frequency detectors, gas density balances, mass spectrometers and other fraction identifying or detecting means may be employed. In large diameter columns or systems the detecting means may be omitted and the operation of the system programmed from data obtained on pilot systems. The gas effluent stream from the chromatographic column 16 is switched to a particular collection system only when the particular gas fraction to be concentrated or recovered in that collection system is emerging from the column.

In my process there may be any number of the same or different collection systems and positions, depending upon the number and type of fractions exiting from the column. In my illustration three possible collecting positions are shown; however, only one collection system will be described for the recovery of one fraction. The beta pinene fraction desired is detected by detector 20 and passed into the branched manifold 22, and is introduced through open valve 24 into a heat exchanger 26 whereby the gas effluent stream at a temperature of about 150° C. is cooled to a temperature of 50–100° C., e.g. 50° C. It is often desirable to directly cool the effluent gas stream from the outlet of a gas chromatographic column to a lower temperature, e.g. −100 to +30° C. in order to increase absorption and to induce condensation or incipient condensation of the fraction material. Often temperatures of from 25 to 250° C. less than the column temperature are used for this purpose. The gas effluent stream containing a large amount of carrier gas, with the fraction material therein, may in passing through the heat exchanger 26 form a fog and/or some condensed liquid beta pinene. Any massive condensate may be removed from the heat exchanger 26 at this point. The gas effluent stream now at a reduced temperature of 50° C. is then introduced into a phase separator 28 or other vapor-liquid disengagement means in which additional liquid fraction material, which can be recovered, is removed. The cooled gas effluent stream emerging from the phase separator 28 will contain a reduced concentration of recoverable amounts in vapor form of the fraction desired in the carrier gas and may also contain some fog or aerosol particles, i.e., very fine particles of the liquid product dispersed in the carrier gas stream.

The cooled gas effluent stream is withdrawn from the phase collector 28 and introduced via conduit 104, valve 103, into the lower end of an absorber vessel 100 maintained at 50–100° C. or a lower temperature than the temperature of the column 16. The temperature should be a temperature which is economically practical and which optimizes or enhances the absorptive capacity of the liquid absorption stream for the gas fraction to be recovered.

The carrier gas substantially free of the chromatographic beta pinene fraction is withdrawn from the other end of the vessel 100 through valve 40 into recycle conduit 42, and hence to a carrier gas clean-up means 44 such as a dryer to remove moisture or other means to clean up the carrier gas and make it suitable for reuse in the chromatographic column 16. The cleaned up carrier gas may then be compressed to the desired pressure by a compressor 46 and reintroduced into the carrier gas source 12 for reuse in the column 16. In the absober vessel 100 the carrier gas is cleaned up by the counter-current absorption of the fraction in the gas effluent stream against a flowing absorbing liquid stream introduced via conduit 147 and valve 148. A liquid absorbent stream rich in the fraction being recovered, i.e. beta pinene is withdrawn from the lower end of the absorber vessel 100 via conduit 108 and open valve 106 and introduced into a storage vessel 110. The fraction-rich liquid absorbent stream is withdrawn from the storage vessel 110, heated in a heat exchanger 112 to a temperature of 100–200° C., e.g. 150° C., pumped via pump 114 through conduit 116 and introduced into the top of a separate and smaller stripping vessel 102 maintained at about 150° C.

The stripping vessel is typically smaller than the absorber vessel, since, the amount of recovery or stripping gas required for the stripping operation is usually very much smaller than the carrier gas in the gas effluent stream processed through the absorption operation. My process is thus particularly of use where the gas fraction sample to be collected is readily absorbable in a liquid or solvent stream or where it is desired to avoid a multiple bed cyclic operation with the attendant problems of the timed switching of beds and a multiplicity of valve operations. The stripper vessel is maintained at a temperature of about 25 to 150° C. higher such as 100° higher than the temperature of the absorbent vessel 100 or a temperature similar to or about the temperature of the column 16. A recovery gas uch as a mixture of steam and nitrogen from a source 60 is introduced via conduit 118 to a heat exchanger 120 where it is heated to the desired temperature, e.g. 100–200° C. The heated recovery gas is then introduced via conduit 122 and open valve 124 into the lower end of the stripper vessel 102 to flow counter-current to the liquid beta pinene enriched stream introduced into the top of vessel 102. Both the stripper and absorption vessels 100 and 102 may be and preferably are packed bed vessels with Raschig rings, Tellerettes or other packing used to promote intimate mixing of the fluid streams therein. The heated recovery gas passes upwardly counter-current to the fraction-rich absorbent stream to be stripped and the beta pinene fraction is concentrated in the vapor phase in the recovery gas stream.

A recovery gas effluent stream comprising a beta pinene enriched recovery gas is withdrawn from the stripping zone 102 via open valve 126 and conduit 128. The recovery gas effluent stream is then cooled in a heat exchanger 130 to the temperature below 100° C., e.g. 0–50° C. and the fraction now in concentrated vapor form condensed from the recovery gas effluent stream. The stream is then passed through a phase separator 132 such as a gas-liquid cyclone and any liquid fraction product recovered. The recovery gas, less the fraction recovered, is withdrawn from the phase separator 132 via conduit 134 and recycled to a recovery gas source for clean-up and reuse in the process via conduit 118. The liquid absorbing stream lean in the gas fraction to be recovered is withdrawn from the lower end of the stripper vessel 102 via conduit 138 and open valve 136, introduced into a heat exchanger 140 where it is cooled to 50–100° C., e.g. 50° C., introduced to a storage vessel 142 from whence it is withdrawn and recycled by pump 146 through conduit 144 and open valve 148 into the top of the absorber 100 for reuse in the absorption cycle.

This fraction collection recovery system may operate intermittently, if necessary, to absorb the flow of gas effluent fraction stream from the chromatographic column. This method is especially applicable as the gas chromatographic systems becomes so large that a multiplicity of chromatographic separating columns are used and fractions from each column may be sent to a single fraction recovery unit. In this manner, the absorption-stripper cycle can operate practically continuously by being fed respectively from the absorption columns in different phases of their cycle.

In my absorbing and stripping operation the recovery of chromatographic fractions by means of a separate recovery gas has been employed. Any recovery gas stream may be employed from which the chromatographic fraction product may be readily condensed or from which the fraction may be easily recovered or concentrated by any means. In some operations, a separate recovery gas need not be employed, but rather a portion of the carrier gas from source 12 or carrier gas withdrawn from vessel 100 may be recycled and employed as all or a part of the recovery gas. In this manner, a recovery gas effluent stream will comprise the carrier gas and the gas fraction. However, this recovery stream will have a much higher concentration of the gas fraction than the gas effluent stream drawn from the bottom of the chromatographic column, thus considerably enhancing the ease and efficiency of separation of the gas fraction component from the gas recovery effluent stream.

It may also be desirable in many cases to compress by mechanical compression the effluent gas stream from the chromatographic column prior to the cooling or absorption operation. The object of compression is to effect a concentration of the effluent stream and the gas fraction by means of mechanical compression. The compressed effluent gas stream occupies a smaller volume, so that the means used for cooling and condensing of the gas fraction in the stream will usually be more economical. Compression of the effluent stream besides reducing its total volume will reduce the mol fraction of the condensible material in the stream. Compression ratios of 2 to about 50, e.g. 2 to 20, are useful to aid in fraction recovery. A series of compression units would typically be required for each fraction collecting position, since good segregation of the peaks passing through a compressor could probably not be obtained. For example, the third fraction collecting position could employ a mechanical compressor 150 in the line just prior to cooling the compressed gas effluent stream in the heat exchanger 26.

In the chromatographic system shown it is, of course, contemplated that temperature programming of the column, i.e. the heating of the column in a predetermined manner may be used to enhance or aid the chromatographic separation of the sample mixture introduced into the column. In addition, the chromatographic system may also employ integrators and recorders in connection with the detector to provide an indication of peak area and evolution time of each fraction. Further our process has been described in connection with the opening and closing of certain valves and conduits to switch the various gas streams back and forth from sorption vessels. It is recognized that some installations may advantageously employ solenoid operated valves or valves responsive to the impulses of the detector, so that an automatic switching, i.e. an opening and closing of the valves, will take place during the recovery and stripping operations.

In some operations modifications may be made in the equipment shown to simplify and reduce the cost. For example, heat exchanger 26 and phase separator 28 may be eliminated where the gas fraction to be recovered can be recovered in good yield by merely employing an absorption system alone. The sample mixtures to be recovered may be any chromatographic fractions which are capable of being separated by chromatographic means. Typical sample mixtures would include both organic and inorganic compounds and mixtures capable of being passed through the column in a gas phase and include mixtures such as hydrocarbon, steroids, essential oil, esters, ethers, terpenes, acetates, alcohols, ketones, aldehydes, etc. Typical chromatographic column temperatures range from about 0 to 300° C. Depending upon the heat sensitive and heat degradation nature of the fractions to be recovered, the absorption may be carried out at temperatures ranging from about −50° to 500° C., for example, 0 to 300° C. In the recovery operation, it is most desirable to prevent large temperature changes in the collection system particularly where a large amount of fluids must be heated and cooled for reuse. Accordingly, low temperature differentials such as 25 to 150° are preferred between the absorption and stripping operations.

The selection of particular temperatures to be employed in my process depends in part upon the particular column temperature selected for the separation of the materials and the temperatures required to condense the fraction to be recovered as well as the efficiency desired and economic factors. Column temperatures may vary greatly depending upon the character of the sample material to be separated. For example, the sample material may comprise a material which has a high vapor pressure and at about room temperature or lower is in a gas state such as low molecular weight hydrocarbon gaseous mixtures, or the material may comprise a solid or liquid material which must be heated prior to or during injection such as would be the case with high molecular weight materials such as polymers, esters, steroids, oils, and the like. The column temperature is selected based upon a number of factors, but the higher temperature may be limited by the heat degradation characteristics of the sample mixture to be separated or the character of the separatory material. In one of the preferred operations the gas effluent stream from the column is cooled so that the gas fraction in the effluent stream approaches or reaches its dew point prior to entering into the sorption and stripping operations. Cooling of the gas effluent stream prior to the sorption operation greatly increases the capacity of the sorption process and material and provides very high absorption capacity for the absorbing liquid in the absorption bed. At or about the dew point of the gas fraction the fraction has a high capacity to go into the liquid state and this, coupled with the solvent or sorption ability of the liquid or solid in the sorption zone, permits the zone to have a high fraction capacity. An optimum economic balance should be reached between the temperature variations of my process. Large temperature variations, i.e. over 250° C. are often undesirable. Absorption operation may generally be conducted at a temperature of 25–50° less than the temperature of the gas effluent stream from the column to about 100–150° less than the temperature of the gas effluent stream from the column. The stripping operation should be carried out at a temperature of about the column temperature or less, but 25 to 250° C. greater than the sorption operation. Higher temperatures than the column temperatures are often not desirable, since the absorbing liquid may be present in too high a degree in the recovery gas effluent stream, while higher temperatures require wider temperature variations and greater heating and cooling capacity. Various and different temperatures for the cooling, absorption and stripping of the recovery operations may be employed where different gas fractions are to be recovered.

The absorbing liquids employed in our process should be characterized by low volatility and be non-deleterious to the product fraction to be separated, i.e. not chemically reacted with or effect the fraction product. The selectivity of the absorbing liquid to the fraction is not of prime importance, but the absorbing liquid should be easily removed or separated from the product. Therefore, an absorbing liquid should not readily form azeotropes with the fraction unless such azeotropes aid in recovery of the fraction. The absorbing liquid should, of course, be stable under the stripping and absorbing operations used.

Typical liquids which may be employed as the liquid absorbing stream in my process include esters, diesters, polyesters, hydroxy compounds like glycols and polyglycols, silicones, oils, aliphatic aromatic and polynuclear hydrocarbons, polyethers, natural and synthetic oils, fluorocarbons, acrylics, polymers, acetals, terpenes, hydrocarbons, ketones and the like and mixtures thereof. The liquid may be the liquid phase or similar material as employed in the chromatographic system. The liquid need not in contrast to the liquid used in the chromatographic column packing 18 be selective for the beta pinene to be recovered. The function of the absorbing liquid is to recover the fraction from the large bulk of carrier gas. For reasons of practicality the liquid used in the chromatographic column such as the cost, liquid stability, vapor pressure and the like may not be practical for use in the absorption zone. For example in the recovery of beta pinene a liquid petroleum naphtha stream having an average boiling point range of 350 to 600° F. may be used as the liquid absorbing stream or a polyethylene glycol ester. Typical absorbing streams often have a boiling point of 25 to 250° C. higher than the boiling point of the gas fraction to be recovered.

As described and illustrated my process provides a novel and improved method and apparatus for the collection of chromatographic fractions from a chromatographic system. My process avoids many of the difficulties in the prior art associated with the recovery of chromatographic fractions from an effluent stream which contains a large amount of carrier gas. My process is efficient and minimizes the need for large temperature changes in the recovery of the chromatographic fractions.

What I claim is:

1. A process of separating a material into two or more gas fractions by chromatographic means and recovering at least one of the fractions so separated which process comprises:
    (1) introducing a material into a chromatographic column containing separatory material therein for separating the material so introduced into two or more gas chromatographic fractions;
    (2) introducing a carrier gas into the chromatographic column;
    (3) withdrawing from the chromatographic column a gas effluent stream comprising carrier gas and a gas fraction to be recovered;
    (4) introducing the gas effluent stream into an absorption zone, which zone is maintained at a temperature of from about the temperature of the gas effluent stream withdrawn from the chromatographic column to a temperature of 250° C. less than this temperature;
    (5) contacting the gas effluent stream in the absorption zone with a liquid absorbing stream whereby at least a part of the gas fraction is absorbed in the liquid stream;
    (6) withdrawing a fraction-lean gas effluent stream from the absorption zone;
    (7) withdrawing a fraction-rich liquid effluent stream from the absorption zone;
    (8) recovering the gas fraction from the liquid effluent stream;
    (9) withdrawing and recycling to the absorption zone at least a part of the liquid effluent stream from which the gas fraction has been recovered.

2. The process of claim 1 which includes prior to introducing the gas effluent stream into the absorption zone the step of:
    cooling the gas effluent stream to a temperature of about 25 to 150° C. less than the temperature of the gas effluent stream withdrawn from the column.

3. The process of claim 1 wherein the gas effluent stream withdrawn from the column contains from about 0.001 to 10.0 mols percent of the gas fraction.

4. The process of claim 1 wherein the gas fraction is absorbed into a non-volatile liquid stream having a boiling point of about 25 to 250° C. higher than the boiling point of the gas fraction to be recovered.

5. The process of claim 1 which includes the step of compressing the gas effluent stream prior to introducing the stream into the absorption zone.

6. The process of claim 1 wherein the liquid absorbing stream is similar to the liquid phase employed as the separatory material in the chromatographic column.

7. The process of claim 1 wherein recovering the gas fraction in the fraction-rich liquid effluent stream includes the steps of:
    introducing the fraction-rich liquid effluent stream into a stripping zone, said zone maintained at a temperature of from 50° to 300° C.;
    contacting the fraction-rich liquid effluent stream in the stripping zone with a recovery gas;
    withdrawing a fraction-rich recovery gas effluent stream from the stripping zone, said stream having a higher concentration of gas fraction than the gas fraction in the gas effluent stream from the chromatographic column;
    recovering the gas fraction from the recovery gas effluent stream; and
    recycling at least a portion of the recovery gas effluent stream from which the gas fraction has been recovered back to the stripping zone.

8. The process of claim 7 wherein at least a part of the fraction-lean gas effluent stream withdrawn from the absorption zone is used as a carrier gas stream.

9. The process of claim 7 wherein the step of recovering the gas fraction from the recovery gas effluent stream includes cooling the recovery gas effluent stream to condense the gas fraction and recovering the gas fraction so condensed.

10. The process of claim 7 wherein at least a part of the fraction-lean gas effluent stream is recycled for use in the chromatographic column; the gas effluent stream is cooled to a temperature of 25 to 150° C. lower than the temperature of the stream withdrawn from the chromatographic column; the recovery gas used in the stripping operation includes steam; and the gas fraction is recovered by cooling and condensing the fraction from the recovery gas effluent stream.

References Cited

UNITED STATES PATENTS

| | | | |
|---|---|---|---|
| 2,026,265 | 12/1935 | Bennett | 55—48 |
| 2,169,210 | 8/1939 | Balcar | 55—54 |
| 2,451,136 | 10/1948 | Wenzke | 55—48 X |
| 2,875,848 | 3/1959 | Cathala | 55—50 |
| 3,002,583 | 10/1961 | Findlay | 55—197 X |
| 3,242,646 | 3/1966 | Miller et al. | 55—48 |

FOREIGN PATENTS 692,119  8/1964  Canada.

REUBEN FRIEDMAN, *Primary Examiner.*

J. DE CESARE, *Assistant Examiner.*